(12) United States Patent
Owens et al.

(10) Patent No.: US 11,846,465 B2
(45) Date of Patent: *Dec. 19, 2023

(54) PRODUCT TRANSPORT CONTAINERS

(71) Applicant: VESTURE LLC, Charlotte, NC (US)

(72) Inventors: Byron Craig Owens, Asheboro, NC (US); Reyad I. Sawafta, Greensboro, NC (US)

(73) Assignee: VESTURE LLC, Asheboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,812

(22) Filed: Jan. 6, 2023

(65) Prior Publication Data

US 2023/0160626 A1    May 25, 2023

Related U.S. Application Data

(63) Continuation of application No. 16/658,704, filed on Oct. 21, 2019, now Pat. No. 11,549,745, which is a
(Continued)

(51) Int. Cl.
*F25D 23/06* (2006.01)
*B65D 25/00* (2006.01)
(Continued)

(52) U.S. Cl.
CPC ............ *F25D 23/066* (2013.01); *A47J 47/08* (2013.01); *A61J 1/165* (2013.01); *B32B 1/02* (2013.01); *B32B 3/266* (2013.01); *B32B 5/022* (2013.01); *B32B 5/18* (2013.01); *B32B 5/245* (2013.01); *B65D 25/005* (2013.01); *B65D 25/14* (2013.01); *B65D 25/2826* (2013.01); *B65D 43/162* (2013.01); *B65D 65/38* (2013.01); *B65D 81/263* (2013.01); *B65D 81/3834* (2013.01); *F25D 3/08* (2013.01); *B32B 2250/03* (2013.01); *B32B 2250/40* (2013.01); *B32B 2255/02* (2013.01); *B32B 2260/021* (2013.01); *B32B 2260/046* (2013.01); *B32B 2262/0253* (2013.01); *B32B 2262/0261* (2013.01); *B32B 2262/0276* (2013.01); *B32B 2262/0284* (2013.01); *B32B 2262/062* (2013.01); *B32B 2264/105* (2013.01);
(Continued)

(58) Field of Classification Search
CPC .. F25D 23/066; F25D 3/08; F25D 2303/0831; A47J 47/08; A61J 1/165; B32B 1/02; B32B 3/266; B32B 5/022; B32B 5/18; B32B 5/245; B32B 2250/03; B32B 2262/0253; B32B 2262/0284; B65D 25/005; B65D 25/14; B65D 25/2826; B65D 43/162; B65D 65/38; B65D 81/263; B65D 81/3834; B65D 2313/04
See application file for complete search history.

*Primary Examiner* — Ana M Vazquez
(74) *Attorney, Agent, or Firm* — TILLMAN WRIGHT, PLLC; Chad D. Tillman

(57) ABSTRACT

Product transport containers are disclosed. Such containers can provide one or more advantages compared to existing containers. For example, product transport containers described herein can maintain a product at a desired temperature for an extended period of time, including without the use of an active heating or cooling component. Such product transport containers described herein may also provide improved breathability, thermal insulation, and/or mechanical strength or dimensional stability. Such containers can include a plurality of walls defining an interior volume and a selectively openable side permitting movement of the product into and out of the interior volume of the container. The walls can be formed from a thermoformed non-woven fabric.

16 Claims, 7 Drawing Sheets

Related U.S. Application Data continuation of application No. 15/451,798, filed on Mar. 7, 2017, now Pat. No. 10,451,335.

(60) Provisional application No. 62/304,622, filed on Mar. 7, 2016.

(51) Int. Cl.
| | |
|---|---|
| *B65D 25/28* | (2006.01) |
| *B65D 25/14* | (2006.01) |
| *A61J 1/16* | (2023.01) |
| *A47J 47/08* | (2006.01) |
| *F25D 3/08* | (2006.01) |
| *B32B 1/02* | (2006.01) |
| *B65D 43/16* | (2006.01) |
| *B65D 81/38* | (2006.01) |
| *B65D 65/38* | (2006.01) |
| *B65D 81/26* | (2006.01) |
| *B32B 5/02* | (2006.01) |
| *B32B 3/26* | (2006.01) |
| *B32B 5/24* | (2006.01) |
| *B32B 5/08* | (2006.01) |
| *B32B 5/18* | (2006.01) |

(52) U.S. Cl.
CPC ... *B32B 2264/108* (2013.01); *B32B 2266/126* (2016.11); *B32B 2307/302* (2013.01); *B32B 2307/304* (2013.01); *B32B 2307/718* (2013.01); *B32B 2307/724* (2013.01); *B32B 2307/73* (2013.01); *B32B 2439/66* (2013.01); *B32B 2439/80* (2013.01); *B65D 2313/02* (2013.01); *B65D 2313/04* (2013.01); *B65D 2585/366* (2013.01); *F25D 2303/0831* (2013.01); *F25D 2331/804* (2013.01)

PRODUCT TRANSPORT CONTAINERS

BACKGROUND

The present disclosure relates to product transport containers and methods of using product transport containers, particularly for maintaining a desired temperature of a product disposed and/or transported within such a container.

It is frequently desirable to transport various products, such as food or medicines, from one location to another location, such as from a point of manufacture to a point of use or consumption. Such products may be in transit for an extended period of time. For some products, extended time spent in transit is not detrimental to the product. For other products, however, extended time periods spent in transmit may cause the products to degrade, spoil, or otherwise become unsuitable for use upon arrival. Changes in temperature during transit can be particularly detrimental to some products. For example, many food products are warm or hot (or cool or cold) when manufactured and are intended to be consumed at a remote location while still warm or hot (or cool or cold). Similarly, some medicines or medical products must be kept cool or cold between manufacture and use.

Various containers have been developed to transport temperature-sensitive products such as food or medicine. For example, it is common to prepare a hot food such as pizza and store it in a cardboard box or package. For transport or delivery to a consumer at a remote location, the cardboard box or package may be placed in a thermally insulated carrying case.

Similarly, medical products may be transported in a thermally insulated container such as a cooler. However, existing containers for transporting temperature-sensitive products such as food or medicine suffer from one or more disadvantages. For example, some existing containers are not capable of maintaining a product at a desired temperature for a period of time sufficient to ensure delivery of the product to an end user while the product is still at the desired temperature. Additionally, other existing containers can maintain a product at a desired temperature for a desired period of time only through the use of active heating or cooling provided via a power supply or other additional component. Some existing containers also fail to provide adequate breathability and/or moisture control, such that the interior of the container may become too humid, thereby degrading the product within the interior. High humidity may be particularly detrimental to some food products, such as food products including vegetables such as broccoli. Existing containers may also provide limited rigidity or mechanical strength, such that these containers and their contents are more vulnerable to damage due to mechanical impact. Moreover, some existing containers are expensive to manufacture, maintain, and/or use.

Therefore, a need exists for improved product transport containers. Such containers should maintain a desired temperature of a product disposed and/or transported within such a container.

SUMMARY

In one aspect, product transport containers are described herein. Such containers, in some cases, can provide one or more advantages compared to existing containers. In some embodiments, for example, a product transport container described herein can maintain a product at a desired temperature for an extended period of time, including without the use of an active heating or cooling component. A product transport container described herein may also provide improved breathability, thermal insulation, and/or mechanical strength or dimensional stability. Additionally, a product transport container described herein can be less expensive to manufacture and/or maintain.

In some embodiments, a product transport container described herein comprises a plurality of walls defining an interior volume. The container further comprises a selectively openable side permitting movement of the product into and out of the interior volume of the container. Moreover, the walls defining the interior volume of the container are formed from a thermoformed and/or non-thermoformed non-woven fabric. The non-woven fabric, in some cases, has a high breathability and/or a high thermal insulation (such as a high R value). The non-woven fabric can also be a rigid or dimensionally stable fabric. In some embodiments, the non-woven fabric comprises or is formed from one or more polyesters, polyolefins, and/or polyamides. It is also possible, in some eases, to replace the non-woven fabric with a different fabric or material, such as a fabric formed from a cellulosic material.

In another exemplary embodiment, a product transport container described herein comprises a body and at least one fastening member. The body comprises a plurality of integrally formed body portions, and each body portion is foldable with respect to at least one other body portion. The fastening member configured to retain the plurality of body portions in a first position, wherein, in the first position, the plurality of portions define an interior volume for housing the product. Notably, the body is formed from a non-woven fabric incorporated with a phase change material.

In some instances, the non-woven fabric (or other fabric) for use in containers described herein comprises or is at least partially formed from a phase change material (PCM); including a PCM that has a phase transition temperature within or near a desired temperature range of the interior volume of the container during transport of the product. For instance, in some cases, the fabric comprises or is at least partially formed by a PCM having a phase transition temperature between 50° C. and 135° C., between 50° C. and 95° C., between 65° C. and 80° C., between 70° C. and 135° C., or between 90° C. and 135° C. Such a PCM can help to maintain a product at a temperature of 50-135° C., 50-95° C. 65-80° C. 70-135° C., or 90-135° C., respectively. For example, in some embodiments, a container having interior and/or exterior walls formed from such a fabric can maintain a hot food product such as a pizza or chicken (or any of many other food products) at a temperature of 65-80° C. for 60 minutes or more.

Alternatively, in other cases, the fabric comprises or is at least partially formed by a PCM having a phase transition temperature between −20° C. and 30° C., between 0° C. and 10° C., between 0° C. and 8° C., between 2° C. and 8° C., or between 15° C. and 35° C. Such a PCM can help to maintain a product at a temperature of within the foregoing ranges, respectively. For instance, in some embodiments, a container having interior and/or exterior walls formed from such a fabric can maintain a cool or cold product, such as a medicine or cold food product, at a temperature of 2-8° C. for 60 minutes, for 1-20 hours, for 1-120 hours, or more than 120 hours. In certain embodiments, for example, and for a long-range shipment of a cold product such a cold food product or a medical product, the container may maintain the product at a temperature of −50-10° C. for up to 5 days.

Further, in some cases, the fabric that defines one or more walls and/or flexible portions of a product container described herein does not comprise or is not formed from a PCM having a phase transition temperature corresponding to desired temperature of the interior volume of the container. In some such cases, the container contains or includes no such PCM material at all. Alternatively, in other instances, the interior volume of the container includes one or more pouches, pockets, sleeves, or other receptacles for receiving and containing a PCM that is not an integral part of the container itself but is instead formed or provided separately and then placed inside the one or more pouches, pockets, sleeves, or other receptacles of the interior volume of the container. In such embodiments wherein a PCM is disposed in the one or more pouches, pockets, sleeves, or other receptacles, the PCM can have a transition temperature described hereinabove and can help to maintain a product disposed in the interior volume of the container at a temperature described hereinabove for a time period described hereinabove. A PCM may also be incorporated into a container described herein through the use of a PCM-containing layer or liner that is disposed within or adjacent to the interior volume of the product transport container.

In addition, in some instances, the PCM included in product transport containers described herein does not require "charging" prior to placement of a product within the interior volume of the product transport container. "Charging" a PCM, for reference purposes herein, comprises heating or cooling a PCM to a temperature above or below, respectively, a transition temperature of the PCM, such that the PCM is "prepared" to provide heating or cooling to the product disposed within the interior volume of the container without first having to absorb thermal energy from or release thermal energy to the product. Instead, the PCM of a container described herein can provide "passive" heating or cooling, in which thermal energy transfer between the PCM at ambient temperature (e.g., a temperature of 20-25° C.) and the product "charges" the PCM or heats or cools the PCM above or below a phase transition temperature of the PCM. Alternatively, in other embodiments, the PCM included in a product transport container described herein is "charged" prior to placement of the product within the interior volume of the product transport container.

Moreover, in some cases, containers described herein exhibit one or more of the thermal insulation properties described hereinabove without the use of any form of active heating or cooling, whether the container does or does not include a PCM. For example, in some embodiments, product transport containers described herein do not include an electrical connector or electrical power supply and/or is not attached to an electrical power supply or external heating or cooling system, such an electrical power supply or healing or cooling system that may be used to heat or cool the interior volume of the container for purposes of maintaining a product disposed in the interior volume at a desired temperature. Further, in some instances, a product transport containers described herein do include any internal heating or cooling source other than the product itself, wherein an "internal" heating or cooling source refers to a source of active or passive cooling that is not integral to the material forming the container itself. Non-limiting examples of such excluded internal heating or cooling sources include a "heat pack" or an "ice pack," respectively. Internal heating or cooling systems (such as heaters or fans) may also be excluded from the container.

Alternatively, in other embodiments, product transport containers described herein may include an electrical power supply and/or electrical connector, and/or be attached to an external electrical power supply, including for purposes of using internally or externally generated electrical power to provide active heating or cooling of the interior volume of the container. Similarly, in some instances, containers described herein further comprise an internal heating or cooling source other than the product.

In addition, in some cases, the walls and/or body defining the interior volume of a container described herein comprise or define one or more perforations, holes, or slits. Further, in some instances, these perforations, holes, or slits are covered by a film. Such a film can provide thermal and/or moisture management properties to the interior volume. For example, in some embodiments, the film comprises or is formed from a material that has selective moisture and/or thermal energy transport properties. In some such cases, the film permits a greater amount of moisture transmission and/or thermal energy conduction across the film in one direction, as opposed to in an opposite direction. For instance, the film may permit more moisture to pass through the film in a direction corresponding to exit of moisture from the interior volume of the container and into an exterior region, as opposed to in a direction corresponding to entrance of moisture into the interior volume of the container from an exterior region.

Similarly, the film of a container described herein may permit more thermal energy (such as thermal energy in the form of electromagnetic radiation having a certain wavelength) to pass through the film in a direction corresponding to entrance of thermal energy into the interior volume of the container from an exterior region, as opposed to in an opposite direction corresponding to exit of thermal energy from the interior volume of the container and into the exterior region.

Moreover, one or more of the plurality of walls and/or the body of a product transport container described herein can comprise or define a handle. Such a handle can be used to carry the container and/or to open the selectively openable side of the container.

Additionally, in some embodiments, one or more walls or other surfaces of the product transport container body described herein can be formed from or coated with a hydrophobic material. Such a hydrophobic material may be located or disposed on an interior wall or surface of the container, and/or on an exterior wall or surface of the container. Placement of hydrophobic material on an interior wall or surface, including a wall or surface defining the internal volume of the container can improve spill and/or stain resistance of the container. Placement of hydrophobic material on an exterior wall or surface of the container can improve the resistance of the wall or surface to the inflow of moisture, including the inflow of moisture to the interior volume of the container in which the product is located.

Further, in some embodiments, the walls and/or body defining the interior volume of a container described herein are attached or secured to one another in a reversible manner, such that the walls can "fold" together or otherwise reversibly attach to one another to form the interior volume, and can also "unfold" or otherwise reversibly detach from one another to one another to cause the interior volume to no longer be fully defined or completely enclosed by the walls. In this manner, greater access of a product to the interior volume of the container may be obtained. Additionally, "unfolding" or otherwise partially disassembling a container in manner described above can permit a plurality of identical or substantially identical containers to be stacked with one another, including in a space-saving manner for storage or transport. Moreover, in some cases, one or more of the walls of the container comprise an attachment member for reversibly coupling walls. In some embodiments, the attachment member is a magnetic attachment member.

In other cases, the attachment member is a hook-and-loop attachment member (such as VELCRO), a zipper, or a latch or clasp. In still other instances, the attachment member is an interlocking feature (such as a ridge or groove) that is integrally formed into the fabric that defines one or more walls of the container. Such an interlocking feature can reversibly couple to a corresponding or mated interlocking feature of another wall of the container. Attachment members such as those described herein may also be used to reversibly open and close the selectively openable side of the product transport container.

In another aspect, methods of transporting and/or storing a product are described herein. In some embodiments, such a method comprises placing the product in the interior volume of a product transport container described herein. The method further comprises transporting the product from a first location to a second location and then removing the product from the interior volume of the container. Any product transport container described hereinabove may be used. Additionally, the product can comprise any product described hereinabove. Moreover, in some cases, a method described herein does not comprise attaching the container to an electrical power supply, or does not comprise cooling or heating the interior volume of the container with a cooling or heating source other than the product, as described above. However, in other instances, the container comprises a PCM, such as a PCM described hereinabove, and the method further comprises heating or cooling the PCM above or below a phase transition temperature of the PCM prior to placing the product in the interior volume of the container.

These and other implementations are described in more detail in the detailed description which follows.

DETAILED DESCRIPTION

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" should generally be considered to include the end points of 5 and 10.

Further, when the phrase "up to" is used in connection with an amount or quantity; it is to be understood that the amount is at least a detectable amount or quantity. For example, a material present in an amount "up to" a specified amount can be present from a detectable amount and up to and including the specified amount I. Product Transport Containers In one aspect, product transport containers are described herein. Exemplary embodiments of such product transport containers will now be further described with reference to the figures.

Figure 1:
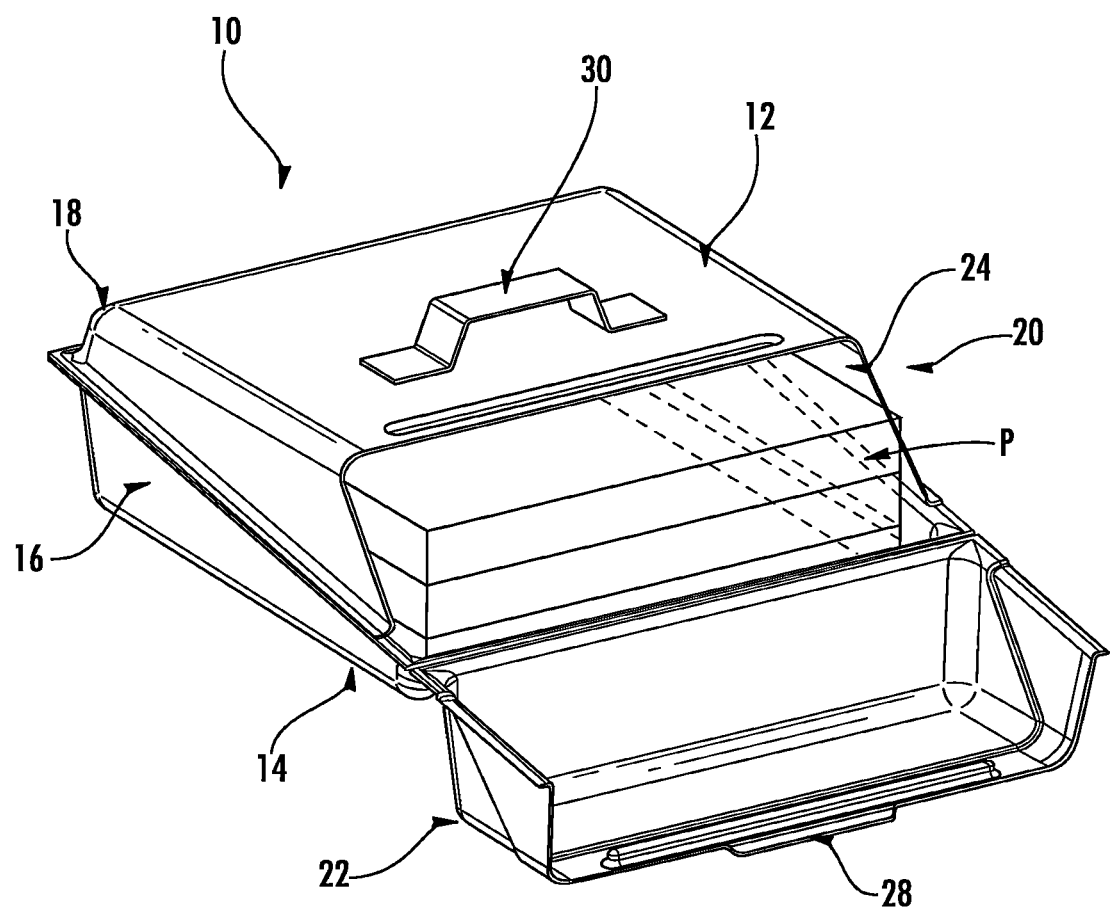
FIG. 1 illustrates a perspective view of a product transport container according to one embodiment described herein, wherein the container is illustrated in an open position.
Figure 2:
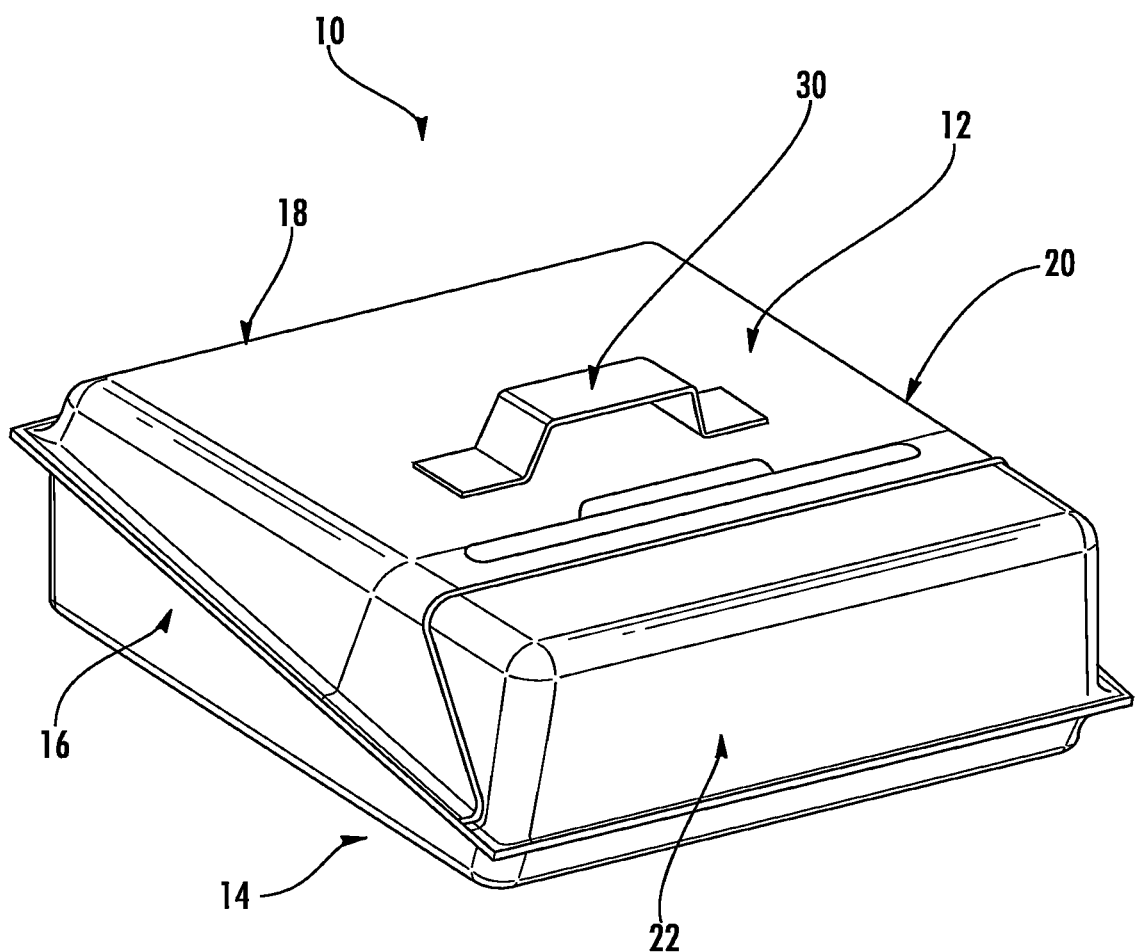
FIG. 2 illustrates a perspective view of the product transport container of FIG. 1, wherein the container is illustrated in a closed position.
Figure 3:
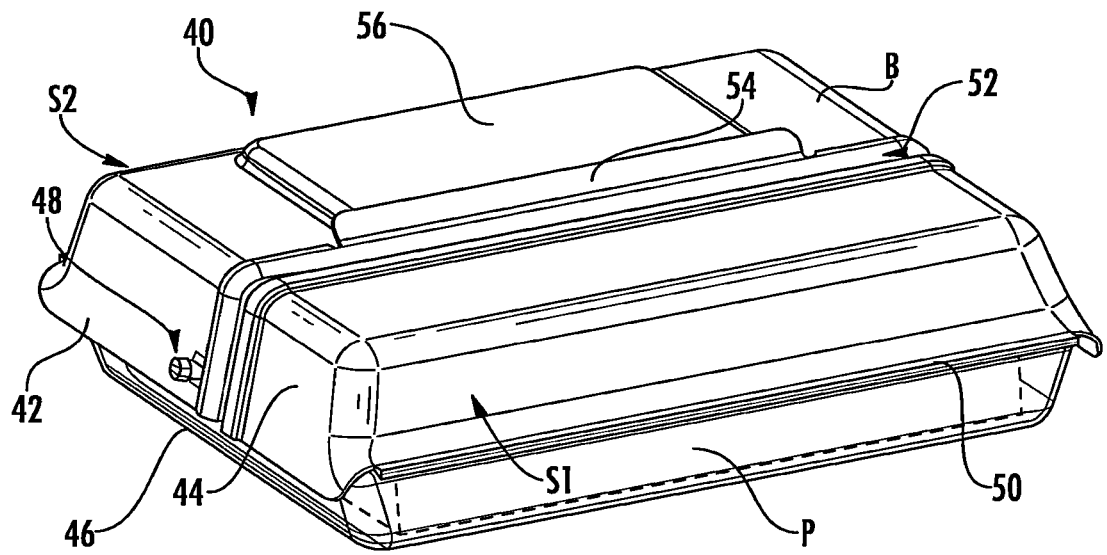
FIGS. 3-10 illustrate various views of a product transport container according to another embodiment described herein.
Figure 4:
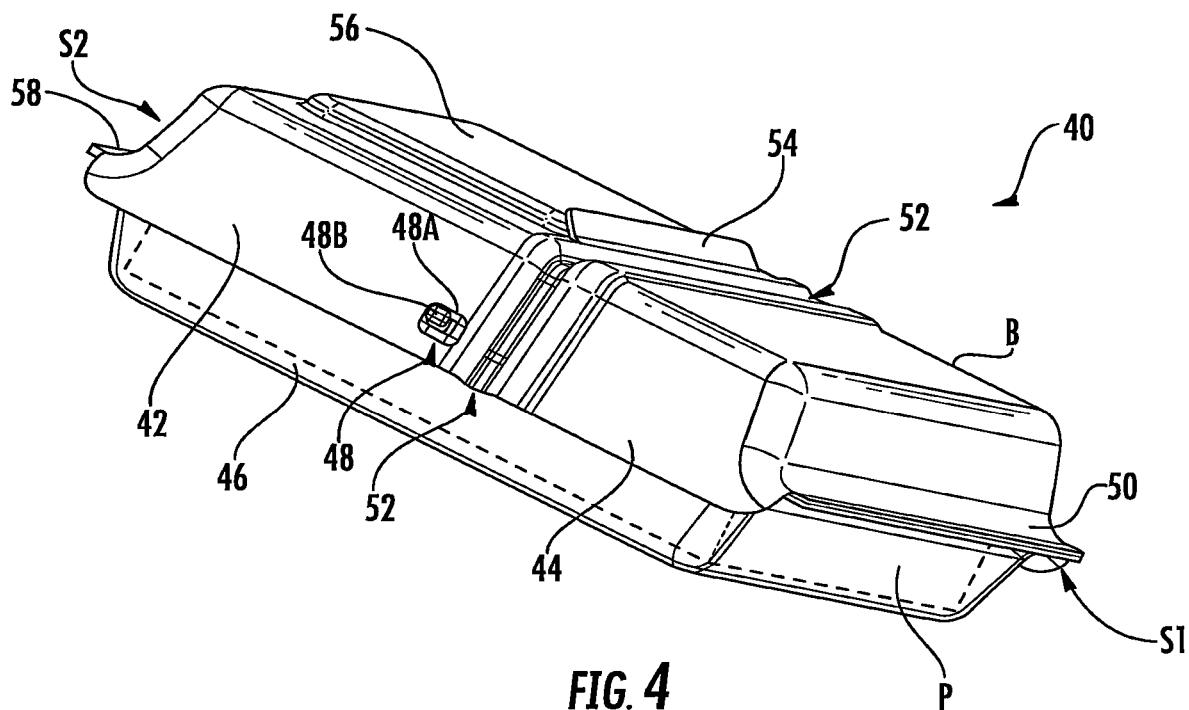
Figure 5:
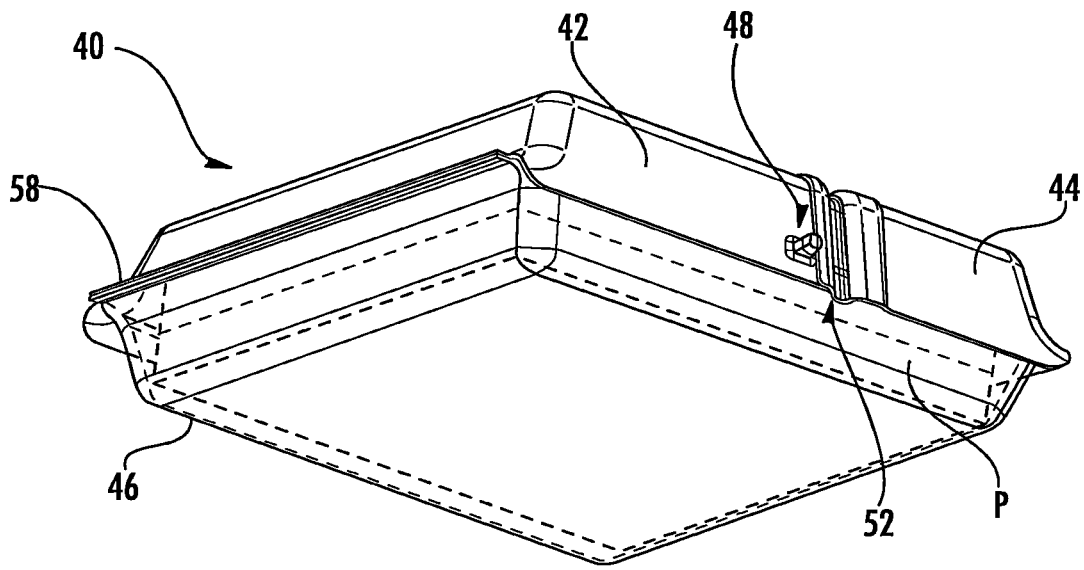

FIG. 1 illustrates a perspective view of a product transport container according to one embodiment described herein, wherein the selectively openable side of the container is illustrated in an open position. FIG. 2 illustrates a perspective view of the product transport container of FIG. 1, wherein tire selectively openable side of the container is illustrated in a closed position.

Now referring to FIG. 1 and FIG. 2, a product transport container 10 is shown having a plurality of walls, including a top wall 12, bottom wall 14, and three side walls 16, 18, 20. The product transport container 10 also has an openable side 22. The plurality of walls 12, 14, 16, 18, 20 and openable side 22 define an inner volume 24. The interior volume 24 can be a single compartment or it can be multiple compartments. The openable side 22 permits the movement of a product P in and out of the interior volume 24 of the product transport container 10.

As illustrated in FIG. 1, the product P may be a pizza disposed in cardboard pizza box. However, other products, such as medical products, may also be disposed in the interior volume 24. The openable side 22 further includes a first handle 28 for ease of opening. The top wall 12 of the product transport container 10 also includes a second handle 30 for carrying the container 10. It should be noted that, in the embodiment of FIG. 1 and FIG. 2, all of the walls 12, 14, 16, 18, 20 and the openable side 22 are formed from a non-woven fabric described herein. It should further be noted that, as illustrated in FIG. 1 and FIG. 2, the product transport container 10 does not necessarily include any source or apparatus for active heating or cooling, such as an electrical connector or electrical power supply or an internal heating or cooling system. Moreover, as illustrated in FIG. 1 and FIG. 2, the product transport container 10 is not attached to an electrical power supply, such an electrical power supply or external heating or cooling system that may be used to heat or cool the interior volume of the container for purposes of maintaining a product disposed in the interior volume at a desired temperature.

Figure 6:
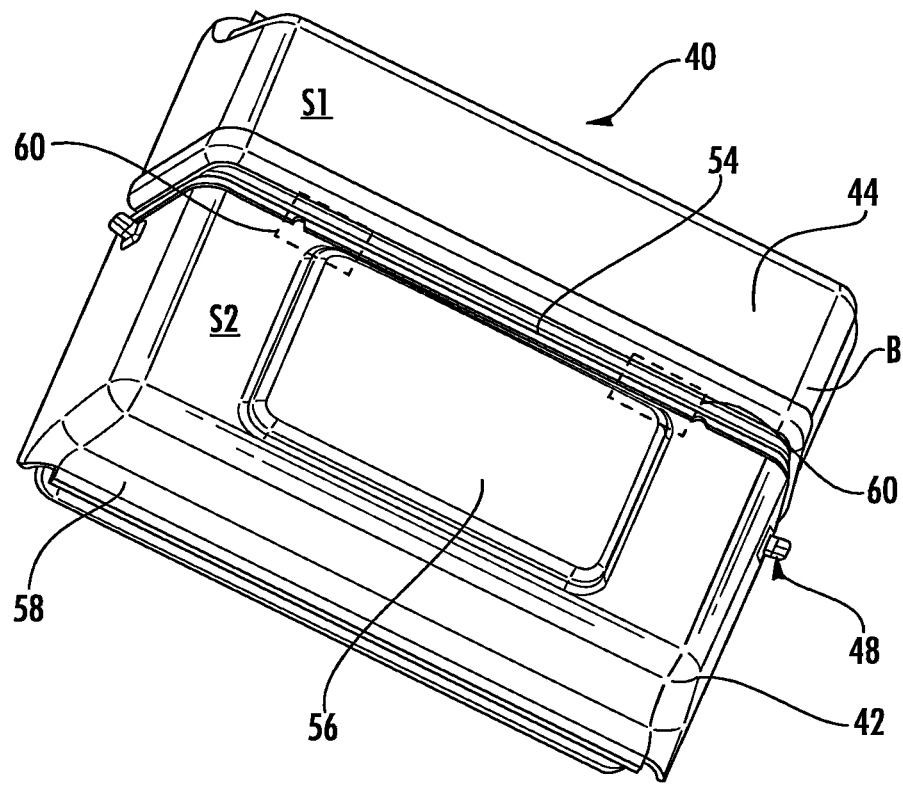
Figure 7:
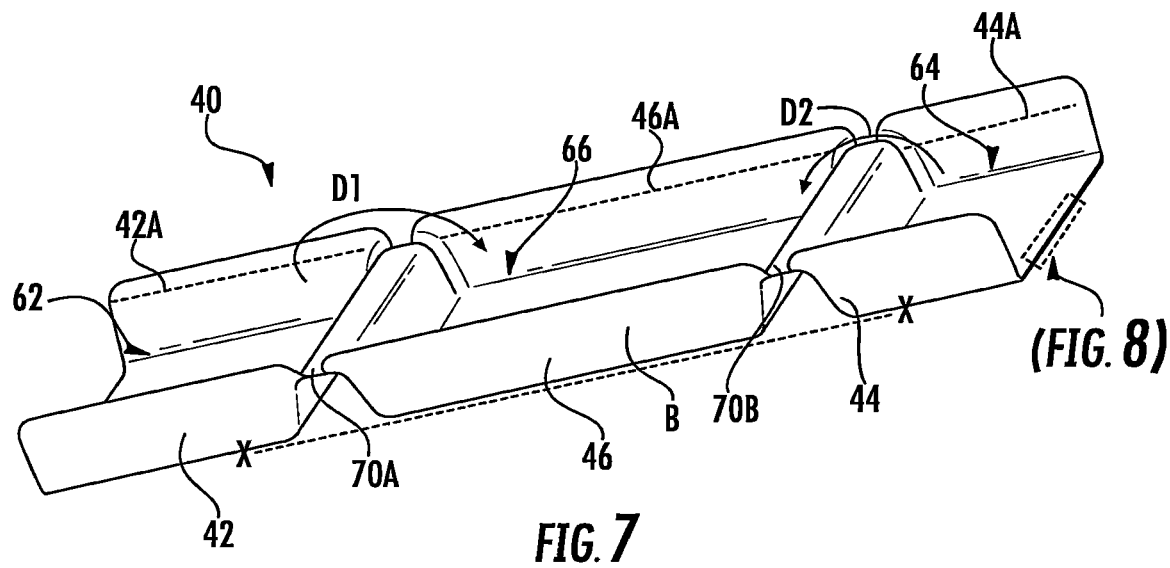

FIGS. 3-10 illustrate various views of a product transport container, generally designated 40 according to a further embodiment described herein. FIGS. 3-6 illustrate various views of product transport container 40, wherein at least one selectively openable side $S_1$ of the container is in a closed position. Conversely. FIG. 7 illustrates a perspective view of product transport container 40, wherein the at least one selectively openable side $S_1$ of the container is in an open position. Product transport container 40 may be selectively openable on more than one side, for example, on at least a first side (e.g., $S_1$) and on an opposing second side $S_2$, where desired. FIG. 11 graphically illustrates the temperature vs. time behavior for exemplary product transport containers 10, 40 as shown and described in FIGS. 1-10.

Now referring to FIGS. 3-6, a product transport container 40 is shown. Container 40 includes a body B comprising a plurality of integrally formed body portions (e.g., 42, 44, and 46). Each body portion is advantageously foldable with respect to at least one other body portion for defining an interior volume for housing a product P. In some embodiments, body B includes at least a first body portion 42, a second body portion 44, and a third body portion 46. More or less than three body portions can be provided, where desired. Body B can comprise and/or be formed from a non-woven fabric comprising a phase change material as described in more detail hereinbelow and, in some embodiments, each body portion (e.g., 42 to 46) can be substantially rigid and preformed, but still foldable via flexible and/or foldable regions of the body B.

Notably, respective first, second, and third body portions 42, 44, and 46 are integrally formed or otherwise connected via flexible and/or foldable regions (e.g., 70A, 70B, FIG. 7). Container 40, or portions thereof, can be opened and closed via flexing or folding first and/or second body portions 42, 44 with respect to third body portion 46. Once each body portion is disposed in a desired position with respect to the other body portions, the body portions may optionally be secured to each other in a fixed position via one or more fastening members 48.

In some embodiments, a single fastening member 48 is provided. In other embodiments, multiple fastening members 48 are provided. The one or more fastening members 48 can comprise a hook-and-loop type of fastening member (e.g., VELCRO), a hook-and-eye type of fastening member, a zipper, a latch, a clasp, a clip, a snap, a button, a magnet, or any other type of fastening member that is not inconsistent with the instant disclosure. Only one type of fastening member can be provided per container 40 or multiple different types of fastening members can be provided per container 40 and used in combination with each other. For example and in some embodiments, one or more VELCRO fasteners and one or more magnet fasteners can be used together for securing portions of container 40 in a closed position that defines an interior volume for holding product P. In other embodiments, one or more magnet fasteners and snap fasteners can be used together. Any type and/or quantity of fastening member(s) 48 may be used singly or in combination, where desired, as long as the type and/or quantity of fastening members is not inconsistent with the present disclosure.

As FIGS. 3-6 illustrate and in some embodiments, one or more of the fastening members 48 can comprise a flexible portion 48A that is configured to attach and detach from a stationary portion 48B. For example, flexible portion 48A can comprise a flexible band, strap, or loop that is configured to stretch, expand, and/or deform on, over, or around stationary portion 48B (e.g., a post, pin, etc.) and attach (e.g., engage) or connect thereto. When attached, the one or more body portions (i.e., 42, 44, and 46) can be fixedly held in a first position (i.e., a closed position) with respect to each other. In the first position, the plurality of body portions (i.e., 42, 44, and 46) defines an interior volume for housing the product P.

In a second position, for example, when flexible portion 48A is not attached to stationary portion 48B, the one or more body portions (i.e., 42, 44, and 46) are not fixedly held with respect to each other and assume the second, open position. In this position, the one or more body portions can relax into a fully open and substantially planar position. That is, in the second position (i.e., an open position), portions of at least the first body portion 42 and the second body portion 44 are coplanar and open relative to the third body portion 46. In the second position, a plurality of containers 40 can be "stacked" on or over each other and optionally stored in the open position until ready to house and/or contain a product P. Unfastening and fastening body portions via fastening member 48 can selectively open and close one or more sides $S_1$, $S_2$ of the container 40, for example, as the flexible portion 48A respectively disengages and engages from the stationary portion 48B.

Still referring to FIGS. 3-6, first and second body portions 42 and 44 can each comprise a respective curved or flared body portion or region 50 and 58. Container 40 is configured to flex, bend, and/or rotate about or proximate flared regions 50 and 58 such that first and second body portions 42 and 44 can move relative to each other and/or third body portion 46. In some embodiments, a respective first side $S_1$ is selectively openable as second body portion 44 moves (i.e., rotates) relative to third body portion 46. Similarly, a second side $S_2$ is selectively openable as first body portion 42 moves (i.e., rotates) relative to third body portion 46.

In some embodiments, flared regions 50 and 58 are configured to bias container 40 in an open position via the concavely curved or flared shape. In the open position, at least first and second body portions 42 and 44 are coplanar and/or have coplanar surfaces that are positioned 180° relative to each other and fully open relative to third body portion 46. First body portion 42 is considered to be fully open relative to third body portion 46 when a top surface of first body portion 42 is coplanar with a bottom surface of third body portion 46, or when the first body portion 42 is disposed approximately 180° with respect to the third body portion 46. Similarly, second body portion 44 is considered to be fully open relative to third body portion 46 when a top surface of second body portion 44 is coplanar with a bottom surface of third body portion 46, or when the second body portion 44 is disposed approximately 180° with respect to third body portion 46. In the fully open position, first body portion 42 is disposed approximately 180° relative to second body portion 44.

Further, first and/or second body portions 42 and 44 can comprise one or more textured surfaces. Textured surfaces can comprise permanently formed (e.g., molded, thermoformed, etc.) textures, such as ridges, depressions, protrusions, or any other non-planar surface or region of body B. Some textured surfaces can contact and/or cooperate with other, adjacent textured surfaces for improving the bond and/or connection between one or more portions of body B, for example, in a closed position. For example and in some embodiments, first body portion 42 can comprise a first textured surface (i.e., 68, FIG. 10) and second body portion 44 can comprise a second textured surface 52, which overlies the first textured surface (i.e., 68, FIG. 10). In some embodiments, second textured surface 52 comprises a depression, groove, or channel that is configured to interlock, engage, cooperate and/or otherwise contact the similarly shaped first textured surface (i.e., 68, FIG. 10) of first body portion 42. First and second body portions 42 and 44 can interlock, in part, via contact and cooperation between textured surfaces (e.g., 52 and 68) thereby improving the degree of closure between portions of container 40. Improved closure between portions of container 40 can advantageously prevent increases or decreases in the temperature associated with the volume defined therein, which can prevent product P from experiencing undesirable changes in temperature.

Container 40 can further comprise an exterior flap or tab portion 54 extending from one or more of the flexible body portions thereof. In some embodiments, tab portion 54 further improves the ability of container 40 to regulate the temperature of a product P housed therein, for example, by preventing or inhibiting hot or cool air from either penetrating or escaping an interior volume of container 40. For example, tab portion 54 can prevent cool air from entering an interior volume of container 40 and decreasing the temperature of the product P contained therein. In other embodiments, hot air is prevented from entering an interior volume of container 40 and increasing the temperature of the product P contained therein. Although only one tab 54 is shown, multiple tabs may be provided about multiple surfaces of the foldable body portions, for example, proximate areas where multiple body portions connect or join.

Tab portion 54 is configured to assist in maintaining the temperature within the interior volume of container 40 via preventing hot or cold air from either entering or escaping. Tab portion 54 can also assist in maintaining the relative humidity or moisture level within the interior volume of container 40. In some embodiments, tab portion 54 is configured to exhaust or vent moisture from inside the container 40 to the outside environment. Venting the moisture provides improved moisture control and/or breathability within the container 40. Tab portion 54 can advantageously prevent moisture from accumulating within the container 40 by allowing the moisture to escape or wick to the outside environment. Moisture may be undesirable within a volume of the container 40 when transporting a hot product P, for example, as the moisture may render the product overly soggy, moist, and unfit for consumption.

Container 40 can further comprise one or more elevated portions, such as an elevated protrusion 56 disposed proximate a top surface of container 40. Protrusion 56 can further improve the container's ability to provide temperature and/or moisture control in some aspects. For example, where a product P is being cooled, any hot air can rise and collect on or over protrusion 56 and then release from the container via the tab 54 that is disposed proximate the protrusion 56. Similarly, moisture can collect on or over surfaces of protrusion 56 and then release from the container via the tab 54. Notably, protrusion 56 and tab 54 work together collectively and synergistically to provide a container 40 having improved temperature and moisture control.

As FIG. 6 illustrates and in some embodiments, at least one or more optional secondary fasteners 60 can be provided either in lieu of, or in addition to the primary fastening member 48. Fasteners 60 are shown in broken lines as they are optional and, where used, may be incorporated within one or more layers of the container body B and not visible from the outside. In an exemplary embodiment, fasteners 60 can comprise one or more pairs of magnets that are configured over opposing surfaces of body B such that one or more sides $S_1$, $S_2$ of container 40 automatically close for defining a volume into which a product P can be placed.

Fasteners 60 can facilitate easy opening and closing of container 40 so that a product P disposed therein can be quickly and easily accessed and retrieved. The placement of fasteners 60 within body B can vary, but in some embodiments, a first magnet of each pair of magnets is disposed in first body portion 42 and a second magnet of each pair of magnets is disposed in second body portion 44 such so that first and second body portions 42 and 44 can magnetically attract and automatically connect thereby collectively defining an interior volume within container 40 over third body portion 46. The interior volume of container 40 is defined by first, second, and third body portions 42, 44, and 46, for example, such that upon connecting first body portion 42 to second body portion 44, an interior volume is defined over third body portion 46 between respective first, second, and third body portions. Container 40 can comprise an interior volume having any size and/or sectional shape. More than one compartment having a respective compartment volume can also be defined within container 40, where desired.

FIG. 7 illustrates a perspective view of product transport container 40 in a fully open position. In the fully open position, each side $S_1$, $S_2$ is fully extended or opened relative to third body portion 46 (i.e., the lower body portion) and body portions 42, 44 (i.e., upper body portions) are each adjacent to third body portion 46 and disposed along a same planar surface or axis, denoted by the line X-X, as third body portion 46. For example, first body portion 42 and a second body portion 44 can each extend from third body portion 46, and first and second body portions 42, 44 can be disposed along a planar surface or axis X-X and positioned at or about 180° relative to each other across third body portion 46.

As FIG. 7 further illustrates and in some embodiments, first body portion 42 is configured to flex, bend, or rotate proximate a first foldable region 70A in a first direction D1 for defining a space between first body portion 42 and third body portion 46. Similarly, second body portion 44 is configured to flex, bend, or rotate proximate a second foldable region 70B in a second direction D2 for defining a space between second body portion 44 and third body portion 46. When portions of the container body B are folded along directions D1 and D2, second body portion 42 opposes second body portion 44 and can be fixedly attached thereto (e.g., via 48, 60, FIG. 6) so that a compartment having a defined volume forms between the collective body portions. In some embodiments, a compartment having a volume is defined by a first interior surface 62, a second surface 64, and a third interior surface 66 of respective first, second, and third body portions 42, 44, and 46.

In some embodiments, first body portion 42 can comprise a first flange or lip 42A extending around a perimeter of first body portion 42. Similarly, second body portion 44 can comprise a second flange or lip 44A extending around a perimeter of second body portion 44, and third body portion 46 can comprise a third flange or lip 46A extending around a perimeter of third body portion 46. The respective lips 42A, 44A, 46A can provide an opening into which one or more bodies of a phase change material (PCM) can be inserted. For example, a sheet or layer of PCM can be inserted between layers of body B via lips 42A, 44A, and 46A. In other embodiments, first and second lips 42A and 44A are configured to compress against third lip 46A, when in the closed position, to prevent the ingress or egress of air into or out of the interior of container 40, when closed, so that fluctuations in temperature in a product P housed within the container 40 are minimized.

Figure 8:
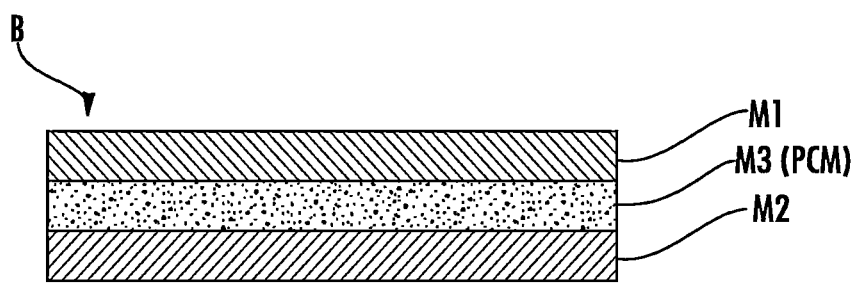

FIG. 8 is a sectional view of an exemplary body B of container 40, for example, as viewed along the area denoted in FIG. 7. In some embodiments, body B comprises a phase change material M3 that is disposed between a first layer of material M1 and a second layer of material M2. Phase change material M3 can comprise any one or more materials that have a phase transition enthalpy of at least about 50 kJ/kg or more. In some embodiments, phase change material M3 comprises a phase transition enthalpy of at least about 100 kJ/kg or more. In further embodiments, phase change material M3 comprises a phase transition enthalpy of at least about 250 kJ/kg or more. In some instances, phase change material M3 has a phase transition enthalpy that is between about 50 kJ/kg and about 350 kJ/kg.

Further, first and second materials M1 and M2 can comprise a same material, or at least two different materials. In some embodiments, first and second materials M1 and M2 each comprise a non-woven fabric. The phase change material M3 can be incorporated between layers of non-woven fabric. Non-woven fabrics that are suitable for providing body portions and walls of containers 10, 40 described herein are set forth in more detail below. In some embodiments, first and second materials M1 and M2 each comprise a polymeric fabric that is thermoformed.

Figure 9:
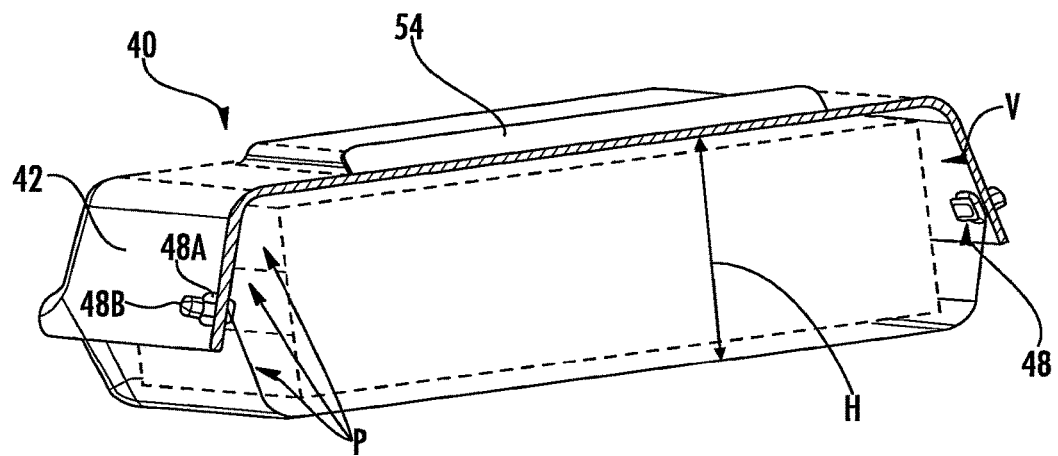

FIG. 9 is a sectional view of container 40 illustrating an interior volume V thereof. Volume V can comprise any suitable size and/or shape, and in some embodiments comprises a predefined height H. As FIG. 9 illustrates, multiple products P (e.g., product containers) can be slacked upon one another and transported inside container 40. For example, container 40 may be configured to hold multiple boxes of pizzas, multiple containers of produce, multiple vials of medicine, etc. Height H can range from about 1 inch (") to about 6 feet ('). In other embodiments, height H can range from about 2" to 2'. In some instances, height H can measure approximately 2" or more; approximately 6" or more; approximately 12" or more; approximately 2' or more; approximately 4' or more; or about 6'. As persons skilled in the art will appreciate, container 40 can accommodate large and small volumes of product P, other than those specifically shown and described.

Figure 10:
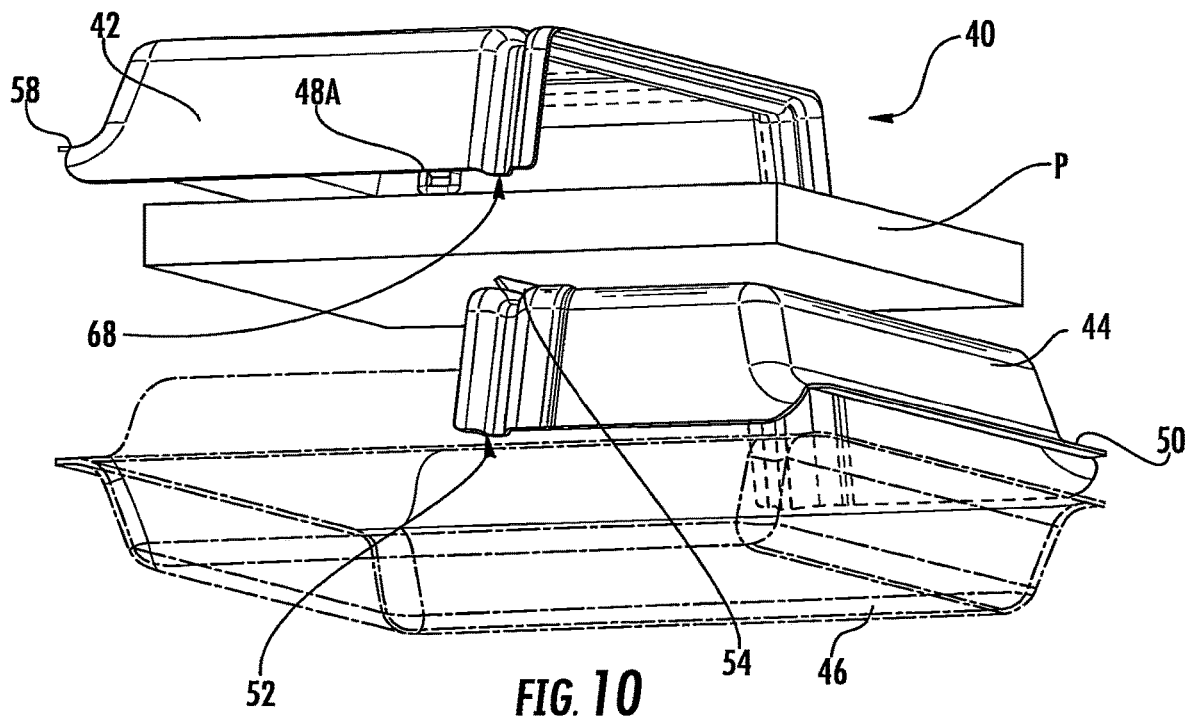
Figure 11:
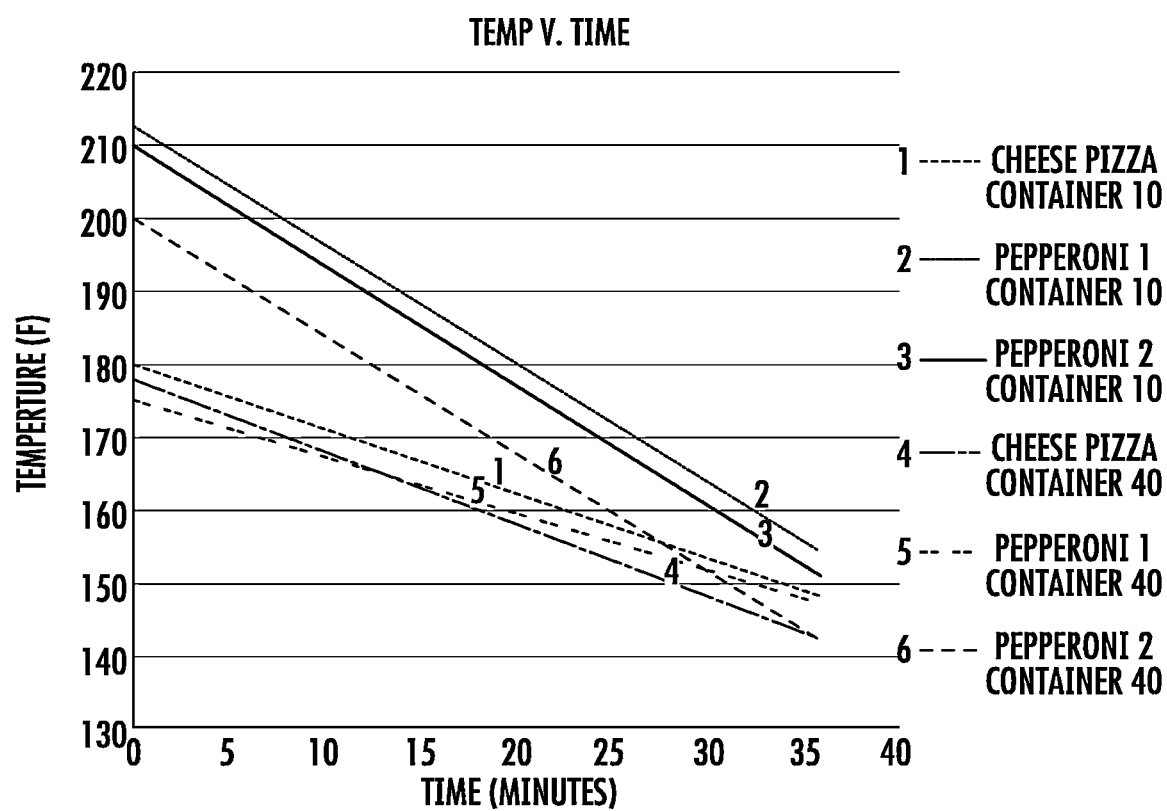
FIG. 11 graphically illustrates temperature versus time curves associated with exemplary product transport containers described herein.

FIG. 10 is an exploded view of container 40. At least one product P can be disposed in a chamber or compartment having a volume defined by first body portion 42, second body portion 44, and third body portion 46. First body portion 42 can comprise a first textured surface 68 that overlies and matingly engages the second textured surface 52 of second body portion 44 for an improved fit and closure. One side of container 40 can open via bending second body portion 44 relative to third body portion 46 and an opposing side of container 40 can open via bending first body portion 42 relative to third body portion 46. First and second body portions 42, 44 can be angled with respect to third body portion 46 and disposed at any one of several positions/locations that exist between the fully open and the fully closed positions.

It should be noted that, in the embodiment of FIGS. 3-10, all of the body portions (e.g., 42, 44, 46,) and sides that define the interior volume (e.g., V, FIG. 9) of the container 40 are at least partially formed from a non-woven fabric as described hereinbelow. Notably, the non-woven fabric can include, contain, enclose, encase and/or otherwise incorporate a phase change material therein for providing passive cooling or heating of the product P contained therein.

It should further be noted that, as illustrated in FIGS. 1-10, the product transport containers 10 and 40 may be devoid of a power source or apparatus for active heating or cooling. This is not necessarily always the case, however; as long-distance shipments may require active (i.e., "electrically powered") heating or cooling systems. Containers 10 and 40 can be configured for active heating or cooling, where desired. Containers 10 and 40 can also be non-conductive and devoid of an electrical connector, electrical power supply, and/or an internal heating or cooling system for easy portability. Any powered or non-powered container 10 and 40 that is not inconsistent with the instant disclosure can be provided, where desired.

FIG. 11 graphically illustrates the temperature versus time data for containers 10 and 40 described hereinabove as used to transport pizza product. Containers 10 and 40 described herein can maintain the temperature of a pizza contained therein within about 25% of its starting temperature for up to 35 minutes. The data in FIG. 11 is provided for exemplary purposes only, and may vary for other products, including cooled products.

Product transport container described herein (e.g., in FIGS. 1-11), in some embodiments, can maintain a product disposed in the interior volume of the container at a desired temperature for a desired period of time. For instance, in some cases, the container maintains the product at a temperature of a relatively high temperature, such as 50-90° C. or 65-80° C., or 90-135° C., or at a relatively low temperature, such as −20 to −50° C., −20 to 0° C., 0-10° C., 2 to 8° C., 10 to 15° C., or 15 to 25° C. for a time period of at least 20 minutes, at least 30 minutes, at least 40 minutes, at least 60 minutes, at least 90 minutes, at least 120 minutes, at least 4 hours, at least 6 hours, at least 8 hours, at least 20 hours, least 1 day, at least two days, or at least 5 days. In some embodiments, the container maintains the product at a temperature described herein for a time period of 20-120 minutes, 20-90 minutes, 20-60 minutes, 20-40 minutes, 30-120 minutes, 30-90 minutes, 30-60 minutes, 1-8 hours, 1-6 hours, 1-20 hours, 1-120 hours, 1-5 days, 1-3 days, or 1-2 days. Moreover, the desired temperature range and time period can be selected based on a desired application. For instance, for "normal" delivery (i.e., delivery for immediate consumption or use) of a hot food product such as pizza or chicken, the container may maintain the product at a temperature of 65-80° C. for up to 60 minutes.

For catering delivery, storage, and/or service of a hot food product, the container may maintain the product at a temperature of 90-135° C. for up to 8 hours. For "normal" delivery of a cold product such as medicine or a cold food product, the container may maintain the product at a temperature of 2-8° C. for up to 60 minutes. For long-range shipment of a cold product such a cold food product or a medical product, the container may maintain the product at a temperature of −50-10° C. for up to 5 days. Additionally, to obtain a desired thermal management property, various properties of the container may be modified as needed. For instance, the amount and/or type of a PCM, the thickness of a thermoformed fabric, and/or the use of an active healing or cooling system may be modified.

Turning now in more detail to specific components of product transport containers, product transport containers described herein comprise a plurality of walls and/or body portions comprising or formed from a thermoformed non-woven fabric. As understood by one of ordinary skill in the art, non-woven fabrics can be broadly defined to refer to sheet or web structures bonded together by entangling fiber or filaments (and/or by perforating films) mechanically, thermally, or chemically. Non-woven fabrics are generally flat or tufted porous sheets that are made directly from separate fibers, molten plastic, or plastic film. Non-woven fabrics are generally not made by weaving or knitting and generally do not require converting the fibers into yarn.

Thermoforming is a manufacturing process wherein a non-woven fabric is heated to a pliable forming temperature, formed to a specific shape (e.g., in a mold), and optionally trimmed to create a usable dimensionally stable product. More particularly, in some embodiments, the fabric or "sheet" or "film" (the latter term being used more frequently when referring to thinner gauges and/or certain material types), is heated in an oven to a high-enough temperature that permits it to be stretched into or onto a mold and cooled to a finished shape. Moreover, in some embodiments described herein, a fabric described herein comprises two or more polymers or other materials having differing melting points, and the thermoforming process results in the selective melting and/or phase segregation of at least one of the polymers or other materials, such that the molten polymer or material may form a coating on a surface of the thermoformed fabric.

Any thermoformed non-woven fabric not inconsistent with the objectives of the present disclosure may be used to form walls and/or body portions of containers described herein. In some embodiments, for instance, a dimensionally stable non-woven fabric or web may be formed from one or more molten thermoplastic materials.

In some cases, a non-woven fabric is formed from a molten mixture of thermoplastic polyester and a polyolefin such as a propylene. Additionally, in certain embodiments, the non-woven fabric may be a spunbond web, a blown microfiber web, a hydroentangled web, or a combination thereof. In some cases, for instance, a dimensionally stable non-woven fabric can be prepared by fiber-forming processes in which filaments of fiber-forming material are formed by extrusion of a mixture of one or more thermoplastic materials, such as one or more aliphatic and/or aromatic polyesters, with a polyolefin such as polypropylene in an amount up to 10% by weight of the mixture. The mixture can then be subjected to orienting forces and passed through a turbulent field of gaseous currents while at least some of the extruded filaments are in a softened condition and reach their freezing temperature (i.e., the temperature at which the fiber-forming material of the filaments solidifies) while in the turbulent field. Such fiber formations processes include melt-spinning (i.e., to form a "spunbond" web), filament extrusion, electrospinning, gas jet fibrillation, and combinations thereof. Moreover, a fabric or web formed by such a process may be post processed into other forms. For example, a fabric or web may be embossed, apertured, perforated, microcreped, or laminated.

Moreover, in some embodiments, a multi-layer non-woven fabric may be formed by laminating or otherwise stacking appropriate fibrous layers. For example, a multi-layer fabric may be formed by overlaying on a support layer a dimensionally stable non-woven fibrous web comprising an overlayer of microfibers on an underlayer comprising a population of sub-micrometer fibers, such that at least a portion of the sub-micrometer fibers contact the support layer at a major surface of the single-layer nonwoven web. In such embodiments of a multi-layer nonwoven fibrous web, it will be understood that the term "overlayer" is intended to describe an embodiment wherein at least one layer overlays another layer in a multi-layer composite web. However, it will be understood that by flipping any multi-layer nonwoven fibrous web 180 degrees about a centerline, what has been described as an overlayer may become an underlayer, and the disclosure is intended to cover such modification. A multi-layer fabric may also be formed during a pressing and/or thermoforming process. For example, in some cases, a first polymeric component of the fabric can, when subjected to heating and/or pressure, phase segregate as a separate fibrous layer or molten thermoplastic sheet. Such a layer or sheet may be disposed on one side of a layer formed from a second polymeric component of the fabric. In this manner, non-woven fabrics having a hydrophobic or "plasticized" surface may be provided.

For any of the previously described exemplary embodiments of a non-woven fabric according to the present disclosure, the fabric will exhibit a basis weight, which may be varied. In some cases, the fabric has a basis weight of up to about 1000 grams per square meter (gsm). In other instances, the fabric has a basis weight of about 1-1000 gsm, 1-500 gsm, 10-1000 gsm, 10-500 gsm, 10-100 gsm, 10-50 gsm, 50-1000 gsm, 50-500 gsm, or 50-100 gsm.

As with the basis weight, the non-woven fabric of a container described herein can have any thickness not inconsistent with the objectives of the present disclosure. In some cases, the fabric has a thickness of up to 100 millimeters (mm), up to 50 mm, up to 20 mm, up to 10 mm, or up to 5 mm. In some embodiments, the fabric has a thickness of about 0.5-150 mm.

As stated above, a non-woven fabric of a container described herein can be formed from any material not inconsistent with the objectives of the present disclosure. In some cases, the nonwoven fabric includes at least one thermoplastic polyester. In some exemplary embodiments, an aromatic polyester is used as a major component in the fiber-forming mixture. An aromatic polyester, in some cases, is selected from poly(ethylene) terephthalate (PET), poly(ethylene) terephthalate glycol (PETG), poly(butylene) terephthalate (PBT), poly(trimethyl) terephthalate (PTT), their copolymers, and combinations thereof. An aliphatic polyester may also be used as a major component in the fiber-forming mixture of a non-woven fabric described herein. In some cases, such an aliphatic polyester comprises a homo- or copolymer of one or more poly(hydroxyalkanoates), and/or of an aliphatic polyester derived from the reaction product of one or more polyols with one or more polycarboxylic acids, such as the reaction product of one or more alkanediols with one or more alkanedicarboxylic acids (or acyl derivatives).

Polyesters may further be derived from multifunctional polyols (e.g., glycerin, sorbitol, and/or pentaerythritol) to form branched, star, and graft homo- and copolymers. Miscible and immiscible blends of aliphatic polyesters with one or more additional semicrystalline or amorphous polymers may also be used. Exemplary aliphatic polyesters include poly(lactic acid), poly(glycolic acid), poly(lactic-co-glycolic acid), polybutylene succinate, polyethylene adipate, polyhydroxybutyrate, polyhydroxyvalerate, blends, and copolymers thereof.

One particularly useful class of aliphatic polyesters are poly(hydroxyalkanoates), derived by condensation or ring-opening polymerization of hydroxy acids, or derivatives thereof. Useful poly(hydroxyalkanoates) include, for example, homo- and copolymers of poly(3-hydroxybutyrate), poly(4-hydroxybutyrate), poly(3-hydroxyvalerate), poly(lactic acid) (as known as polylactide), poly(3-hydroxypropanoate), poly(4-hydropentanoate), poly(3-hydroxypentanoate), poly(3-hydroxyhexanoate), poly(3-hydroxyheptanoate), poly(3-hydroxyoctanoate), polydioxanone, polycaprolactone, and polyglycolic acid (i.e., polyglycolide). Copolymers of two or more of the above hydroxy acids may also be used, for example, poly(3-hydroxybutyrate-co-3-hydroxyvalerate), poly(lactate-co-3-hydroxypropanoate), poly(glycolide-co-p-dioxanone), and poly(lactic acid-co-glycolic acid). Blends of two or more of the poly(hydroxyalkanoates) may also be used, as well as blends with one or more polymers and/or copolymers.

Additional examples of aliphatic polyesters include those homo- and copolymers derived from (a) one or more of succinic acid; adipic acid; 1,12 dicarboxydodecane; fumaric acid; glutartic acid; diglycolic acid; or maleic acid; and (b) one of more of ethylene glycol; polyethylene glycol; 1,2-propane diol; 1,3-propanediol; 1,2-propanediol; 1,2-butanediol; 1,3-butanediol; 1,4-butanediol; 2,3-butanediol; 1,6-hexanediol; 1,2 alkane diols having 5 to 12 carbon atoms; diethylene glycol; polyethylene glycols having a molecular weight of 300 to 10,000 daltons; propylene glycols having a molecular weight of 300 to 4000 daltons; block or random copolymers derived from ethylene oxide, propylene oxide, or butylene oxide; dipropylene glycol; and polypropylene glycol, and (c) optionally a small amount (e.g., 0.5-7.0-mole %) of a polyol with a functionality greater than two such as glycerol, neopentyl glycol, and pentaerythritol. Such polymers may include polybutylenesuccinate homopolymer, polybulylene adipate homopolymer, polybutyleneadipate-succinate copolymer, polyethylenesuccinate-adipate copolymer, polyethylene glycol succinate homopolymer and polyethylene adipate homopolymer. Commercially available aliphatic polyesters include poly(lactide), poly(glycolide), poly(lactide-co-glycolide), poly(L-lactide-co-trimethylene carbonate), poly(dioxanone), poly(butylene succinate), and poly(butylene adipate).

As described above, one or more polyolefins may also be used to form a non-woven fabric described herein. Non-limiting examples of polyolefins that may be used include polyethylene, polypropylene, and mixtures, blends, or copolymers thereof. Olefin (in particular, polypropylene) homopolymers may be atactic, isotactic, syndiotactic, or a combination thereof. An olefin copolymer can be a random copolymer, a statistical copolymer, a block copolymer, or a blend or combination thereof.

Moreover, one or more polyamides may be used to form a non-woven fabric described herein. A polyamide, in some cases, comprises a nylon.

In general, the molecular weight of one or more polymers used to form a non-woven fabric may be chosen so that the one or more polymers may be processed as a melt. For polylactide, for example, the weight average molecular weight may be up to about 1,000,000, up to about 500,000, or up to about 300,000 daltons. In some instances, the weight average molecular weight may be about 10,000 to 1,000,000 daltons or about 30,000 to 300,000 daltons.

As described above, the thermoformed non-woven fabric of a container described herein, in some cases, has a high breathability, a high thermal insulation R value, and/or a high degree of rigidity or dimensional stability. A "breathable" material, for reference purposes herein, can refer to a material that is permeable to air and/or water vapor under ambient conditions, such as under a pressure of 1 atm, in at least one direction. In particular, a breathable material can be permeable to air and/or water vapor in a direction corresponding to exit of air and/or water vapor from the interior of the volume enclosed by the non-woven fabric. A thermal insulation R value can be provided in "United States" units of 1 h·ft$^{2\circ}$ F./Btu, or in "SI" units of K·m$^2$/W. An R value may also be measured in any manner not inconsistent with the objectives of the present disclosure. In some instances, a non-woven fabric of a container described herein has a (U.S.) R value, per inch, of 2 to 8. A "dimensionally stable" fabric can refer to a fabric having a dimensionally stable shape or three dimensional shape. In some cases, a dimensionally stable fabric has at least one dimension which decreases by no greater than 10% in the plane of the fabric, when the web is heated to a temperature at or within 15° C. or 20° C. above a glass transition temperature of the fibers of the fabric while in an unrestrained condition.

Moreover, in some cases, a thermoformed non-woven fabric described herein can be combined with another fabric or material to form walls of a container descried herein. For example, in some cases, a thermoformed non-woven fabric forms or defines one or more exterior or outer walls or layers of a container, and a non-thermoformed non-woven fabric forms or defines one or more interior or inner walls or layers of the container. Similarly, it is also possible for a container described herein or for the walls of a container described herein to include or be formed from an additional thermally insulating material. Such an additional thermally insulating material, in some instances, comprises a foam (closed cell and/or open cell), an aerogel, and/or a fabric loaded with a foam and/or an aerogel. Such multi-layer, composite, or laminate walls, in some embodiments, may provide a high degree of thermal insulation while also providing or maintaining high breathability.

In some embodiments, a product transport container described herein comprises a PCM. In some cases, the PCM is incorporated into the non-woven fabric used to form walls of the container. A PCM can be incorporated into the non-woven fabric in any manner not inconsistent with the objectives of the present disclosure. For example, the PCM can be a comonomer or copolymer used to form the non-woven fabric in a manner described above. The PCM may also be physically entrapped within or otherwise incorporated into the non-woven fabric, though the PCM may not itself form a primary structural component of the fibers, binders, or sheets that define the non-woven fabric.

Additionally, in some cases, a PCM is disposed in pouches, pockets, sleeves, or other receptacles of the interior volume of the container. Any PCM not inconsistent with the objectives of the present disclosure may be used in a product transport container described herein.

Further, a PCM of a container described herein can either absorb or release energy using any phase transition not inconsistent with the objectives of the present disclosure. For example, the phase transition of a PCM described herein, in some embodiments, comprises a transition between a solid phase and a liquid phase of the PCM, or between a solid phase and a mesophase of the PCM. A mesophase, in some cases, is a gel phase. Thus, in some instances, a PCM undergoes a solid-to-gel transition. In some embodiments, the gel of a solid-to-gel transition does not comprise a continuous liquid phase. Further, in some cases, the gel of a solid-to-gel transition does not comprise water or is substantially free of water.

Moreover, in other instances, the solid-to-gel transition of a PCM described herein does not comprise a formal phase change. In some embodiments, for example, the solid-to-gel transition is a transition in viscosity from a high viscosity to a low viscosity. The high viscosity comprises a viscosity of at least about 25,000 cP when measured according to ASTM standard D2983. The low viscosity comprises a viscosity of about 20,000 cP or less when measured according to ASTM standard D2983. Further, in some embodiments, the low viscosity comprises a viscosity between about 200 cP and about 20,000 cP, a viscosity between about 200 cP and about 10,000 cP, between about 1000 cP and about 15,000 cP, or between about 1000 cP and about 5000 cP. Moreover, in some cases, the solid-to-gel transition of a PCM described herein comprises a transition from a rigid solid state to a flexible solid state of the PCM. In some instances, the rigid solid state comprises an amorphous solid state.

Alternatively, in other embodiments, the rigid solid state comprises a crystalline solid state. The flexible solid state, in some cases, comprises an amorphous state. In other embodiments, the flexible solid state comprises a crystalline state. Further, a PCM in a rigid solid state, in some instances, has a viscosity of about 25,000 cP or more when measured according to ASTM standard D2983. In contrast, a PCM in a flexible solid state, in some embodiments, has a viscosity of about 20,000 cP or less when measured according to ASTM standard D2983. In some cases, a PCM in a flexible solid state has a viscosity between about 200 cP and about 20,000 cP, between about 200 cP and about 10,000 cP, between about 1000 cP and about 15,000 cP, or between about 1000 cP and about 5000 cP when measured according to ASTM standard D2983.

In addition, a PCM of a container described herein can have any phase transition temperature not inconsistent with the objectives of the present disclosure. A phase transition temperature of a PCM or mixture of PCMs, in some embodiments, is between about −50° C. and about 90° C. at 1 atm, between about −20° C. and about 90° C. at 1 atm, or between about −20° C. and about 80° C. at 1 atm. In some cases, a phase transition temperature is between about −50° C. and about 0° C. at 1 atm or between about −20° C. and about 0° C. at 1 atm. In some instances, a phase transition temperature is between about 0° C. and about 20° C. at 1 atm or between about 0° C. and about 10° C. at 1 atm. In some embodiments, a phase transition temperature is between about 2° C. and about 8° C. at 1 atm. In some embodiments, a phase transition temperature is between about 5° C. and about 10° C. at 1 atm. In other cases, a phase transition temperature is between about 30° C. and about 90° C. at 1 atm, between about 50° C. and about 70° C. at 1 atm, between about 55° C. and about 65° C. at 1 atm, or between about 65° C. and about 75° C. at 1 atm. In some instances, a phase transition temperature is about 70° C. at 1 atm.

Moreover, as described above, a PCM or mixture of PCMs can be selected to provide a phase transition temperature selectively adapted for maintaining either a relatively high or hot temperature, or else a relatively low or cold temperature. Further, in some cases, a PCM or mixture of PCMs has a phase transition enthalpy of at least about 50 kJ/kg or at least about 100 kJ/kg. In other embodiments, a PCM or mixture of PCMs has a phase transition enthalpy of at least about 150 kJ/kg, at least about 200 kJ/kg, at least about 300 kJ/kg, or at least about 350 kJ/kg. In some instances, a PCM or mixture of PCMs has a phase transition enthalpy between about 50 kJ/kg and about 350 kJ/kg, between about 100 kJ/kg and about 350 kJ/kg, between about 100 kJ/kg and about 220 kJ/kg, or between about 100 kJ/kg and about 250 kJ/kg.

Moreover, a PCM of a container described herein can have any composition not inconsistent with the objectives of the present disclosure. In some embodiments, for instance, a PCM comprises an inorganic composition. In other cases, a PCM comprises an organic composition. In some instances, a PCM comprises a salt hydrate. Suitable salt hydrates include, without limitation, $Ca(NO_3)_2 \cdot 3H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_2PO_4 \cdot 12H_2O$, $Na_3PO_4 \cdot 12H_2O$, $Na_2B^4O_7 \cdot 10H_2O$, $Na_3PO_4 \cdot 12H_2O$, $LiCH_3COO \cdot 2H_2O$, and/or mixtures thereof.

In other embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a combination, mixture, or plurality of differing fatty acids.

In some embodiments, a PCM comprises an alkyl ester of a fatty acid. Any alkyl ester not inconsistent with the objectives of the present disclosure may be used. For instance, in some embodiments, an alkyl ester comprises a methyl ester, ethyl ester, isopropyl ester, butyl ester, or hexyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM comprises a combination, mixture, or plurality of differing alkyl esters of fatty acids.

Non-limiting examples of alkyl esters of fatty acids suitable for use in some embodiments described herein include methyl caprate, methyl caprylate, methyl laurate, methyl myristate, methyl palmitate, methyl stearate, methyl palmitoleate, methyl oleate, methyl linoleate, methyl docosahexanoate, methyl ecosapentanoate, ethyl caprate, ethyl caprylate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl caprate, isopropyl caprylate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl caprate, butyl cprylate, butyl laurate, butyl myristate, butyl palmitate, butyl stearate, butyl palmitoleate, butyl oleate, butyl linoleate, butyl docosahexanoate, butyl ecosapentanoate, hexyl caprate, hexyl caprylate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM comprises a fatty alcohol. Any fatty alcohol not inconsistent with the objectives of the present disclosure may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. The hydrocarbon tail can also be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a combination, mixture, or plurality of differing fatty alcohols.

In some embodiments, a PCM comprises a fatty carbonate ester, sulfonate, or phosphonate. Any fatty carbonate ester, sulfonate, or phosphonate not inconsistent with the objectives of the present disclosure may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM comprises a paraffin. Any paraffin not inconsistent with the objectives of the present disclosure may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pengtacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM comprises a polymeric material. Any polymeric material not inconsistent with the objectives of the present disclosure may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene). Moreover, in some cases, a PCM comprising a polymeric material is incorporated into a non-woven fabric formation process, as described above, such that the PCM is entrapped within the non-woven web and/or forms a part of the laminate or fiber structure of the non-woven web.

Additional non-limiting examples of phase change materials suitable for use in some embodiments described herein include BioPCM materials commercially available from Phase Change Energy Solutions (Asheboro, N.C.), such as BioPCM-(-50), BioPCM-(-40), BioPCM-(-30), BioPCM-(-25), BioPCM-(-20), BioPCM-(-16), BioPCM-(-14), BioPCM-(-12), BioPCM-(-10), BioPCM-(-8), BioPCM-(-6), BioPCM-(-4), BioPCM-(-2), BioPCM-4, BioPCM-6, BioPCM-Q2, BioPCM-Q3, BioPCM-Q4, BioPCM-Q5, BioPCM-Q6, BioPCM-Q7, BioPCM-Q8, BioPCM-Q10, BioPCM-Q12, BioPCM-Q15, BioPCM-Q18, BioPCM-Q20, BioPCM-Q21, BioPCM-Q23, BioPCM-Q25, BioPCM-Q27, BioPCM-Q30, BioPCM-Q32, BioPCM-Q35, BioPCM-Q37, BioPCM-Q42, BioPCM-Q49, BioPCM-Q55, BioPCM-Q60, BioPCM-Q62, BioPCM-Q65, BioPCM-Q69, BioPCM-Q75, BioPCM-Q80, BioPCM-Q85, BioPCM-Q90, BioPCM-Q95, BioPCM-Q105, BioPCM-Q115, BioPCM-Q125, BioPCM-Q135, BioPCM-Q150, and others.

It is further to be understood that a container described herein can comprise a plurality of differing PCMs, including differing PCMs of differing types. Any mixture or combination of differing PCMs not inconsistent with the objectives of the present disclosure may be used. In some embodiments, for example, a fixture comprises one or more fatty acids and one or more fatty alcohols. Further, as described above, a plurality of differing PCMs, in some cases, is selected based on a desired phase transition temperature and/or latent heat of the mixture of PCMs.

Further, in some embodiments, one or more properties of a PCM described herein can be modified by the inclusion of one or more additives. Such an additive described herein can be mixed with a PCM and/or disposed in a fixture described herein. In some embodiments, an additive comprises a thermal conductivity modulator. A thermal conductivity modulator, in some embodiments, increases the thermal conductivity of the PCM. In some embodiments, a thermal conductivity modulator comprises carbon, including graphitic carbon. In some embodiments, a thermal conductivity modulator comprises carbon black and/or carbon nanoparticles.

Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including a pure metal or a combination, mixture, or alloy of metals. Any metal not inconsistent with the objectives of the present disclosure may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler dispersed within a matrix formed by the PCM. In some embodiments, a thermal conductivity modulator comprises a metal matrix structure or cage-like structure, a metal tube, a metal plate, and/or metal shavings. Further, in some embodiments, a thermal conductivity modulator comprises a metal oxide. Any metal oxide not inconsistent with the objectives of the present disclosure may be used. In some embodiments, a metal oxide comprises a transition metal oxide. In some embodiments, a metal oxide comprises alumina.

In other embodiments, an additive comprises a nucleating agent. A nucleating agent, in some embodiments, can help avoid subcooling, particularly for PCMs comprising finely distributed phases, such as fatty alcohols, paraffinic alcohols, amines, and paraffins. Any nucleating agent not inconsistent with the objectives of the present disclosure may be used.

In addition, in some cases, the walls or foldable body portions defining the interior volume of a container described herein comprise define one or more perforations, holes, or slits. Further, in some instances, these perforations, holes, or slits are covered by a film. Any film not inconsistent with the objectives of the present disclosure may be used. In some embodiments, for instance, a film comprises or is formed from a material that has selective moisture and/or thermal energy transport properties. In some such cases, the film comprises or is formed from TYVECK or mylarized TYVEK.

It is to be understood that the various components of a product transport container described herein can be combined in any manner or combination not inconsistent with the objectives of the present invention. For example, a product transport container can comprise walls formed any thermoformed nonwoven fabric described herein in combination with any PCM described herein.

II. Methods of Transporting and/or Storing a Product

In another aspect, methods of transporting and/or storing a product are described herein. In some embodiments, such a method comprises placing the product in the interior volume of a container described herein. Any container described in Section I hereinabove may be used. A method described herein can also comprise transporting the product from a first location to a second location and then removing the product from the interior volume of the container.

In some cases, the product is transported from the first location to the second location and immediately removed for consumption or use at the second location, such as may occur in a pizza delivery application. In other cases, the product may remain stored in the container for a period of time following arrival at the second location, such as may occur in a food catering application. In certain embodiments, for example, for long-range shipment of a cold product such a cold food product or a medical product, the container may maintain the product at a temperature of −50-10°° C. for up to 5 days.

In some embodiments, whether storage does or does not occur, a method described herein does not comprise attaching the container to an electrical power supply or cooling or heating the interior volume of the container with a cooling or heating source other than the product. Thus, as described above, in some cases, a method described herein does not comprise actively heating or cooling the product. Instead, the product transport container can provide the entirety of the thermal management functionality in such instances. However, it is also possible to use active heating or cooling, either during transport or after arrival of the product at the second location. Additionally, in some embodiments, the container comprises a PCM and the method further comprises heating or cooling the PCM above or below a phase transition temperature of the PCM prior to placing the product in the interior volume of the container. Such a "charged" PCM may, in some cases, extend the period of time for which the container can maintain a desired temperature of the product, during transport and/or upon arrival at the second location.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

What is claimed is:

1. A product transport container comprising:
a plurality of walls defining an interior volume, which walls are attached to one another in a reversible manner; and
a selectively openable side permitting movement of a product into and out of the interior volume of the container;
wherein the walls are formed from a non-woven, dimensionally stable fabric; and
wherein the container is collapsible and comprises a phase change material.

2. The container of claim 1, wherein the interior volume of the container includes a receptacle in which the phase change material is contained.

3. The container of claim 1, wherein the interior volume of the container includes receptacles in each of which the phase change material is contained.

4. The container of claim 1, wherein the phase change material is not an integral part of the container.

5. The container of claim 4, wherein the phase change material has a phase transition temperature between −50° C. and 0° C. at 1 atm, between 0° C. and 10° C. at 1 atm, between 2° C. and 8° C. at 1 atm, or between 5° C. and 10° C. at 1 atm.

6. The container of claim 4, wherein the phase change material has a phase transition temperature between 50° C. and 95° C. at 1 atm.

7. The container of claim 1, wherein the container further comprises an internal heating or cooling source other than the product.

8. The container of claim 1, wherein the container further comprises an electrical power supply and/or electrical connector to provide active heating or cooling of the interior volume of the container.

9. The container of claim 1, wherein one or more of the plurality of walls comprise a handle.

10. The container of claim 1, wherein the container comprises one or more fasteners comprising one or more pairs of magnets.

11. The container of claim 1, wherein the fabric comprises one or more polyesters, polyolefins, and/or polyamides.

12. The container of claim 1, wherein the product comprises a food product and the container maintains the food product at a temperature between 65° C. and 75° C. for 60 minutes or a temperature between 90° C. and 1 50° C. for 2 to 8 hours.

13. The container of claim 12, wherein the food product comprises pizza, fries, and/or chicken.

14. The container of claim 1, wherein the product comprises a medical product and the container maintains the medical product at a temperature between 2° C. and 10° C. for 60 minutes.

15. A method of transporting product in a collapsible product transport container having a plurality of walls formed from a non-woven, dimensionally stable fabric, which walls are attached to one another in a reversible manner and define an interior volume of the product transport container, the method comprising:
(a) charging the phase change material of the product transport container by heating the phase change material above a phase transition temperature of the phase change material;
(b) after charging the phase change material, placing a product in the interior volume of the product transport container by opening a side of the product transport container and inserting the product into the interior volume of the product transport container;
(c) transporting the product transport container with the product contained within the interior volume of the product transport container while passively heating the interior volume of the product transport container by the phase change material; and
(d) after transporting the product, opening the side of the product transport container and withdrawing the product from the interior volume of the product transport container; and
after performing said steps (a)-(d),
(e) again, charging the phase change material of the product transport container by heating the phase change material above the phase transition temperature of the phase change material;
after charging the phase change material again, placing another product in the interior volume of the product transport container by opening the side of the product transport container and inserting the other product into the interior volume of the product transport container;
(g) transporting the product transport container with the other product contained within the interior volume of the product transport container while passively heating the interior volume of the product transport container by the phase change material; and
(h) after transporting the other product, opening the side of the product transport container and withdrawing the other product from the interior volume of the product transport container.

16. A method of transporting product in a collapsible product transport container having a plurality of walls formed from a non-woven, dimensionally stable fabric, which walls are attached to one another in a reversible manner and define an interior volume of the product transport container, the method comprising:

(a) charging the phase change material of the product transport container by heating the phase change material above a phase transition temperature of the phase change material;

(b) after charging the phase change material, placing a product in the interior volume of the product transport container;

(c) transporting the product transport container with the product contained within the interior volume of the product transport container while passively heating the interior volume of the product transport container by the phase change material; and (d) after transporting the product, withdrawing the product from the interior volume of the product transport container; and after performing said steps (a)-(d), (e) again, charging the phase change material of the product transport container by heating the phase change material above the phase transition temperature of the phase change material;

after charging the phase change material again, placing another product in the interior volume of the product transport container;

(g) transporting the product transport container with the other product contained within the interior volume of the product transport container while passively heating the interior volume of the product transport container by the phase change material; and (h) after transporting the other product, withdrawing the other product from the interior volume of the product transport container.

* * * * *

UNITED STATES PATENT AND TRADEMARK OFFICE
CERTIFICATE OF CORRECTION

PATENT NO. : 11,846,465 B2  
APPLICATION NO. : 18/093812  
DATED : December 19, 2023  
INVENTOR(S) : Byron Craig Owens and Reyad I. Sawafta It is certified that error appears in the above-identified patent and that said Letters Patent is hereby corrected as shown below:

In the Specification

At Column 6, Line 25, after "wherein", delete "tire" and insert --the--.

At Column 11, Line 19, after "can be", delete "slacked" and insert --stacked--.

In the Claims

In Claim 15, at Column 22, Line 29, after "(a) charging", delete "the" and insert --a--.

In Claim 15, at Column 22, Line 52, at the beginning of the line, insert --(f)-- before "after charging".

In Claim 16, at Column 23, Line 5, after "(a) charging", delete "the" and insert --a--.

In Claim 16, at Column 24, Line 6, at the beginning of the line, insert --(f)-- before "after charging".

Signed and Sealed this  
Thirtieth Day of January, 2024

Katherine Kelly Vidal  
*Director of the United States Patent and Trademark Office*